Feb. 3, 1925.
G. PRICE
1,524,953
AUTOMATICALLY ADJUSTABLE GAMBREL FOR SUSPENDING DRESSED HOGS
Filed Aug. 28, 1923
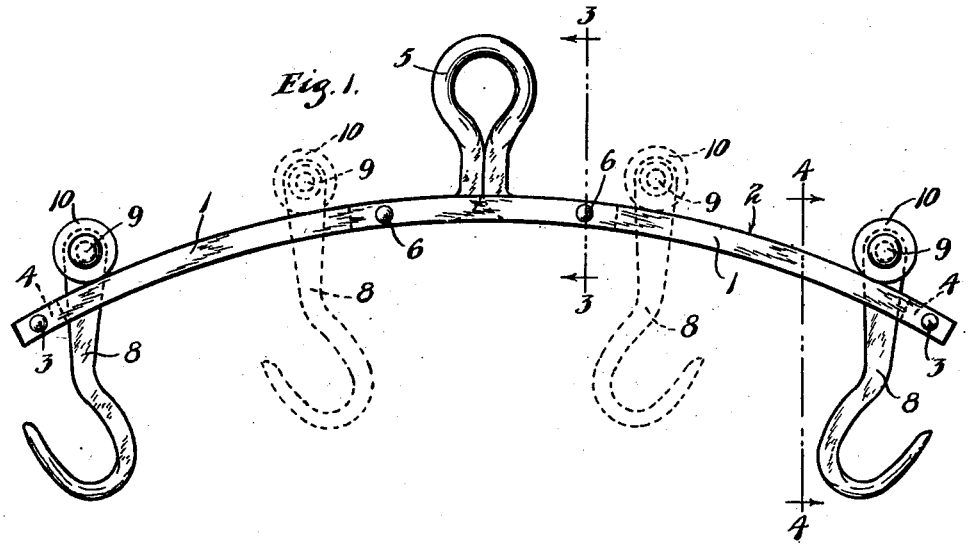
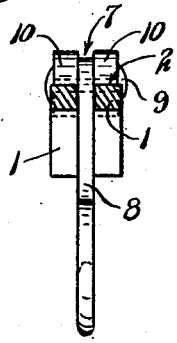
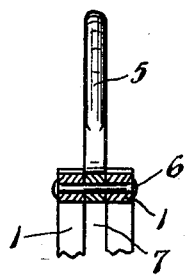
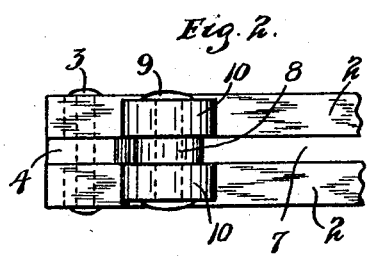
INVENTOR.
GUST PRICE.
BY HIS ATTORNEY.
James F. Williams Patented Feb. 3, 1925.

1,524,953

UNITED STATES PATENT OFFICE.

GUST PRICE, OF BOYCEVILLE, WISCONSIN.

AUTOMATICALLY-ADJUSTABLE GAMBREL FOR SUSPENDING DRESSED HOGS.

Application filed August 28, 1923. Serial No. 659,741.

*To all whom it may concern:*

Be it known that I, GUST PRICE, a citizen of the United States, residing at Boyceville, in the county of Dunn and State of Wisconsin, have invented certain new and useful Improvements in Automatically-Adjustable Gambrel for Suspending Dressed Hogs; and I do hereby declare the following to be a full, clear, and exact description of the invention, such as will enable others skilled in the art to which it appertains to make and use the same.

This invention relates to a gambrel or device for suspending animal carcasses during the butchering operation. As is well known, it is common practice to suspend the animal carcasses from some suspension means for the purpose of cleaning, scraping, skinning, etc.

It is an object of this invention to provide a simple and efficient suspension means having automatically adjustable means thereon for carrying the carcasses.

It is a further object of the invention to provide such a device comprising a downwardly curved bar supported at its top central portion and having hooks at each end movable thereon and depending therefrom.

It is a more specific object of the invention to provide a device comprising such a bar formed of spaced sections thus forming a slot through which hooks depend which hooks are carried by rollers movable on top of said sections.

These and other objects and advantages of the invention will more fully appear from the following description made in connection with the accompanying drawings in which like reference characters refer to the same parts throughout the different views and in which—

Fig. 1 is a view in side elevation of the device showing parts thereof in different positions in dotted lines;

Fig. 2 is a partial top plan view of the device;

Fig. 3 is a vertical section taken on line 3—3 of Fig. 1 as indicated by the arrows; and Fig. 4 is a vertical section taken on line 4—4 of Fig. 1 as indicated by the arrows.

Referring to the drawings, the device is shown as comprising downwardly curved bar 1 formed of parallel sections 2 which in the embodiment of the invention illustrated are of substantially rectangular form having flat tops. The sections 2 are secured together at their end portions by rivets 3 passing therethrough and through spacing blocks 4 disposed between said ends. A supporting or suspending device 5 is disposed at the center of said bar and is formed as an upwardly projecting eye or loop the end portions of which are disposed between the sections 2 and secured thereto by rivets 6. Slots 7 are thus formed by the sections 2 and extend between the ends of member 5 and the spacing blocks 4. A hook member 8 depends through each of the slots 7 and has the upper end of its shank pivotally mounted on a rivet 9 extending through and forming the axle of a pair of rollers 10, each of which travels on top of one of the sections 2, said shank being thus disposed between said rollers and said rollers being held in position by the heads of the rivet 9.

In operation the legs of the animal carcass will be connected to the hooks 8 in the usual manner and when the cracass is allowed to depend or the gambrel is elevated, the weight of the carcass will cause the rollers 10 and hooks 8 to move outwardly toward the ends of the bar 1. If the carcass is of considerable weight, the rollers and hooks will move to their extreme positions being stopped by the spacing blocks 4. If the carcass is of light weight such as that of a rabbit, the hooks may remain in an intermediate position. The spreading of the legs is thus automatically accomplished. The device is conveniently supported from any suitable means by the supporting device or eye 5. The carcass will automatically be centered on the device so that the bar 1 will stand in a general horizontal position or with its central radius vertical.

From the above description it is seen that applicant has provided an extremely simple and efficient gambrel or suspension device. The parts of the device are few, can be ruggedly made and are very durable. The device can be produced at small cost and the same has been thoroughly tested in actual practice and found to be very successful and efficient for the purpose intended.

It will, of course, be understood that various changes may be made in the form, details, arrangement and proportions of the parts without departing from the scope of applicant's invention which, generally stated, consists of a device capable of carrying out the objects above stated such as shown and described and set forth in the appended claims.

What is claimed is:

1. A suspending device for animal carcasses comprising a bar curved downwardly at each side of a central point and having openings therethrough, a single support rigid with said bar extending upwardly from said point and automatically adjustable roller hooks movable longitudinally at each side of said support and in said openings.

2. A suspending device for animal carcasses comprising a bar curved downwardly at each side of its central point, a support extending upwardly from said point, and automatically adjustable hooks movable longitudinally of said bar at each side of said support, said bar being formed of laterally spaced portions, and rollers movable on said portions, said hooks depending from said rollers between said portions.

3. A suspending device for animal carcasses comprising a bar formed of spaced parallel downwardly curved sections secured together at their ends so as to form a slot therebetween, a supporting means secured to said bar and projecting centrally thereabove, spaced rollers mounted to travel on top of said sections at each side of said supporting means having axles spanning said rod and hooks depending through said slot and carried by said axles.

4. A gambrel comprising a downwardly curved bar formed of spaced parallel sections with flat tops, means connecting the ends of said sections, a supporting member secured to and extending above said bar centrally thereof and having its lower portion disposed between said sections whereby a slot is formed between said sections at each side of said supporting means, rollers movable on each of said sections and at the sides of each of said slots, a rivet connecting each pair of said rollers and forming a common axle therefor and a hook pivotally mounted on said rivet and depending through each of said slots whereby said hooks and rollers can travel lengthwise in said slots and are limited in their outward movement by the means connecting the ends of said sections.

In testimony whereof I affix my signature.

GUST PRICE.